United States Patent [19]

Larriva et al.

[11] Patent Number: 5,377,935
[45] Date of Patent: Jan. 3, 1995

[54] SPACECRAFT CERAMIC PROTECTIVE SHIELD

[75] Inventors: René F. Larriva, Fairfax Station, Va.; Anne Nelson, Washington, D.C.; James G. Czechanski, Arlington; Ray E. Poff, Vienna, both of Va.

[73] Assignee: Interferometrics Inc., Vienna, Va.

[21] Appl. No.: 61,073

[22] Filed: May 14, 1993

[51] Int. Cl.$^6$ ............................................. B64C 1/40
[52] U.S. Cl. ............................................. 244/121
[58] Field of Search ............... 244/160, 121, 117 R, 244/117 A, 158 A, 133; 89/36.02, 36.11; 428/920, 76, 74, 44, 911

[56] References Cited

U.S. PATENT DOCUMENTS

| | | |
|---|---|---|
| 3,439,885 | 4/1969 | Sackleh . |
| 3,575,786 | 12/1968 | Baker et al. . |
| 3,874,855 | 4/1975 | Legrand . |
| 4,114,985 | 9/1978 | Friedman ............... 244/121 |
| 4,268,562 | 5/1981 | Bacon et al. ............ 244/121 |
| 4,713,275 | 12/1987 | Riccitiello et al. ....... 244/158 A |
| 4,812,359 | 3/1989 | Hall ....................... 244/121 |
| 4,879,165 | 11/1989 | Smith . |
| 5,067,388 | 11/1991 | Crews et al. . |
| 5,217,185 | 6/1993 | Rucker .................. 89/36.02 |
| 5,236,151 | 8/1993 | Hagle et al. ............. 244/158 A |

FOREIGN PATENT DOCUMENTS 3913561 10/1990 Germany .................... 244/160

OTHER PUBLICATIONS

S. J. Bless et al., "Hypervelocity Penetration of Ceramics," Int. J. Impact Engng vol. 5, pp. 165–171, 1987.
Charles E. Anderson, Jr., "Scale Modeling Issues in Armor Penetration Experiments," Aug. 1991.
A. A. Kozhushko, "Resistance of Ceramics to Penetration at Impact Velocities Above 5 Km/S" vol. 1, Oct. 1991.

Primary Examiner—Galen L. Barefoot
Attorney, Agent, or Firm—Finnegan, Henderson, Farabow, Garrett & Dunner

[57] ABSTRACT

A low areal density protective shield apparatus, and method for making same, for protecting spacecraft structures from impact with hypervelocity objects, including a bumper member comprising a bumper ceramic layer, a bumper shock attenuator layer, and a bumper confining layer. The bumper ceramic layer can be SiC or B$_4$C; the bumper shock attenuator layer can be zirconia felt; and the bumper confining layer can be aluminum. A base armor member can be spaced from the bumper member and a ceramic fiber-based curtain can be positioned between the bumper and base armor members.

20 Claims, 3 Drawing Sheets 5,377,935

SPACECRAFT CERAMIC PROTECTIVE SHIELD

This invention was made with United States Government support under Contract Nos. NAS-9-18680 and DAAH01-92-C-R0007, awarded by the National Aeronautics and Space Administration (NASA) and the Advanced Research Projects Agency (ARPA), respectively. The United States Government has certain rights in the invention.

BACKGROUND OF THE INVENTION

1. Field of the Invention

The present invention relates to a shield for protecting spacecraft structures from impact with hypervelocity objects having densities on the average of 4.0 g/cm$^3$ or more.

2. Description of Related Art

During the early years of space exploration, the principal danger to spacecraft in the low earth orbit environment consisted of high velocity (approximately 20 km/sec), small (approximately 10$^{-6}$ g), low density (approximately 0.6 g/cm$^3$) micrometeoroids impacting the spacecraft. To combat this threat, a shield was designed known as the Whipple shield, which consists of two aluminum components. These components have generally been referred to as the "bumper" and the "base armor" with the base armor being the last component of protection to the spacecraft. The Whipple shield also includes a space between the two components. By using two components with a space between them, less mass per unit area is required for the same protection as provided by a single solid aluminum shield. A projectile impacting the bumper at hypervelocity fragments into a debris cloud. This debris cloud will spread out while it travels through the space between the bumper and the base armor, and thus will impact the base armor over a wider area. This dispersed impact decreases the probability of penetration of the base armor protecting vulnerable components of the spacecraft.

Over the past 30 years, there has been an increase in the amount of orbital debris from man-made sources. In addition to the increase in the amount of debris, the newer debris have been estimated to have dramatically increased in density to an average of 4.5 g/cm$^3$ or more. Hypervelocity impact experiments have shown that the current Whipple shields are not adequate to protect against these new larger, higher density debris. Accordingly, a shield that will provide adequate protection without drastically increasing the shielding mass would be advantageous because of the costs associated with launching heavy payloads.

SUMMARY OF THE INVENTION

The objects of the present invention are to provide a low areal density shield apparatus for protecting spacecraft structures from impact with hypervelocity objects, including projectiles with densities of 4.0 g/cm$^3$ or greater.

To achieve the objects and in accordance with the purpose of the invention, as embodied and broadly described herein, the invention includes a bumper comprising a bumper ceramic layer, a first bumper shock attenuator layer, and a first bumper confining layer. Preferably, the bumper ceramic layer has a Vickers hardness of greater than 1000 kg/mm$^2$, a density less than 5.0 g/cm$^3$, and a melting point greater than 1700° C.

Another and more specific object of the invention is to provide a shield apparatus which can be assembled in space for protecting spacecraft from impact with hypervelocity objects. To achieve this object, the invention includes a protective shield that has a modular structure which can be quickly and easily assembled with loops and hooks. This modular structure achieves the further object of allowing the shield to be replaceable or capable of being supplemented with additional shielding. As a consequence, traditional shields which are susceptible to catastrophic penetration from projectiles in today's space environment, or those that have been damaged, can be modified with this invention to provide adequate protection.

Additional objects and advantages of the invention may be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several preferred embodiments of the invention and together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts. For purposes of explaining the present invention, the terms "bumper" and "base armor" used below are not limited to their traditional usage such that a "base armor" is a component of last protection and a "bumper" is an additional shielding component. It is intended that the terms "bumper" and "base armor" used below both can mean a component of last protection or an additional shielding component.

In accordance with the invention, the present invention for a shield apparatus protecting spacecraft from impact with hypervelocity objects includes a bumper, defined by a front and back face.

Figure 1:
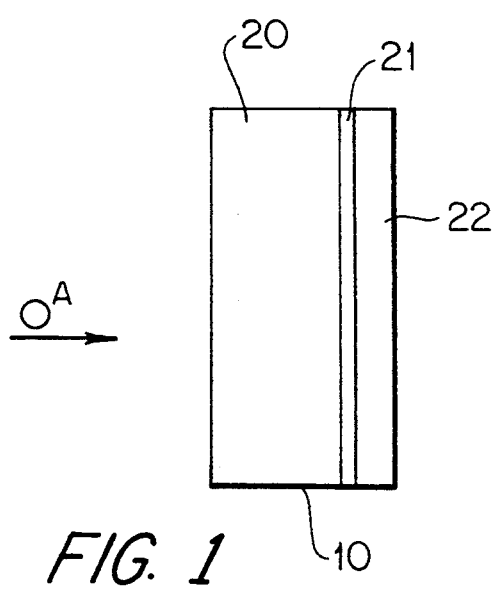
FIG. 1 is a side view of an open-faced ceramic embodiment of the invention.

As embodied herein and as shown in FIG. 1, bumper 10 includes a bumper ceramic layer 20. Preferably, bumper ceramic layer 20 has a Vickers hardness of greater than 1000 kg/mm$^2$, a density less than 5.0 g/cm$^3$ and a melting point greater than 1700° C. A ceramic with these properties is advantageous in a spacecraft protective shield because the hardness assists in eroding the projectile (depicted as A in FIG. 1) when it impacts the front face of bumper 10. The erosion reduces the projectile's mass and also increases the friction between the projectile and the ceramic, causing the projectile to lose energy through heat and drag forces. The high hardness is also advantageous because it assists in providing penetration resistance greater than that provided by metals when impacted by objects at hypervelocities. The higher melting points of such ceramics are advantageous because they can absorb heat resulting from the projectile undergoing phase change during penetration of the protective shield. A density of less than 5.0 g/cm$^3$ is advantageous because it minimizes the mass of the protective shield, a paramount concern because of the costs of launching heavy payloads into space. Ceramics that provide these properties include, but are not limited to, for example, TiC, Nb$_2$O$_5$, TiB$_2$, VO$_2$, TiO$_2$, Al$_2$O$_3$, Si$_3$N$_4$, AlN, SiC, SiO$_2$, B$_4$C, and Al$_4$C$_3$.

More preferably, bumper ceramic layer 20 is made of SiC or B$_4$C because they provide hardnesses as high or higher than 2800 kg/mm$^2$ and their densities are closer to that of aluminum (2.70 g/cm$^3$), the material traditionally used in spacecraft protective shields.

In accordance with the invention, bumper 10 further includes a first bumper shock attenuator layer and a first bumper confining layer. As embodied herein and shown in FIG. 1, first bumper shock attenuator layer 21 is defined by a front and back face, with the front face of first bumper shock attenuator layer 21 placed substantially against the back face of bumper ceramic layer 20. First bumper confining layer 22 is defined by a front and back face, with the front face of first bumper confining layer 22 placed substantially against the back face of first bumper shock attenuator layer 21.

A shock wave results from a projectile's impact on the front face of bumper 10 and absent shock attenuation would normally travel faster through the shield material than the projectile itself. First bumper shock attenuator layer 21 provides the advantage of attenuating the shock wave from rebounding off the front face of first bumper confining layer 22 and coming back to precondition or precrack bumper ceramic layer 20 ahead of the projectile.

Preferably, first bumper shock attenuator layer 21 is a thin layer of zirconia felt (MacMaster-Carr ® No. 87795K84) which is 0.050 in. thick or less and is attached to bumper ceramic layer 20 with an adhesive or cement, and more preferably a high-temperature ceramic cement which will not degrade under the heat generated by a penetrating projectile. Alternatively, other materials having low transmittance of sound energy and being suitable for the space environment may be used for first bumper shock attenuator layer 21, such as for example, Nextel ® or zirconia adhesive (MacMaster-Carr ® No. 7564A11).

First bumper confining layer 22 is preferably made of a ductile material having a modulus of elasticity greater than 9×10$^6$ psi, a yield strength greater than 20×10$^3$ psi, a percent elongation greater than 8%, and a density less than 10 g/cm$^3$. First bumper confining layer 22 preferably is attached to first bumper shock attenuator layer 21 with an adhesive or cement, and more preferably a high-temperature ceramic cement. First bumper confining layer 22 is more preferably made of aluminum which provides sufficient ductility at a relatively low cost and weight penalty. Additionally, the ratio of thicknesses between confining layer 22 and ceramic layer 20 is preferably no greater than 1 to 2.

First bumper confining layer 22 provides the advantage of confining portions of bumper ceramic layer 20 that may be fractured upon impact by a projectile so that the fractured ceramic may continue to have effectiveness in preventing penetration of projectiles. In addition to having the ductility and strength to confine the ceramic material, the ductility of first bumper confining layer 22 minimizes spalling of first bumper confining layer 22. First bumper confining layer 22 also reduces spallation of the hard ceramic material from becoming a secondary threat of penetrating the spacecraft.

Figure 2:
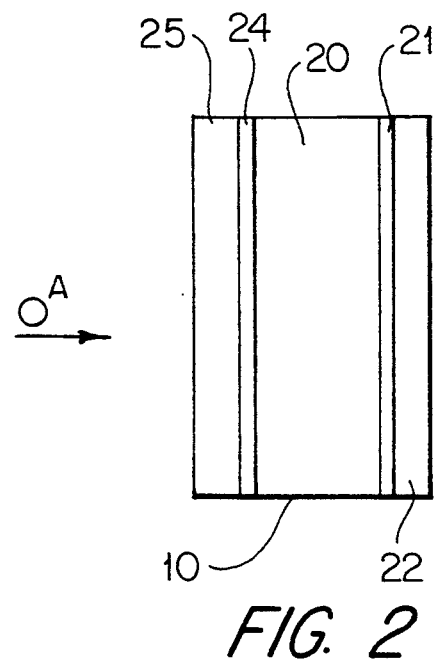
FIG. 2 is a side view of a fully-confined ceramic embodiment of the invention.

The open-faced ceramic embodiment of the present invention described above and shown in FIG. 1 may result in a spray of ceramic material ejecta from the front face of bumper ceramic layer 20 when impacted by a projectile because it is unconfined on that face. This embodiment provides the advantage of reduced confining layer mass by eliminating a second confining layer used in other embodiments of this invention, as shown, for example, in FIG. 2. Accordingly, for this embodiment more mass can be allocated for bumper ceramic layer 20 at the same areal density as all embodiment with two confining layers.

In an alternative embodiment of the present invention, called the fully-confined ceramic embodiment, bumper 10 of the protective shield may further include a second bumper shock attenuator layer 24 and second bumper confining layer 25. As embodied herein and shown in FIG. 2, second bumper shock attenuator layer 24 is defined by a front and back face with the back face of second bumper shock attenuator layer 24 placed against the front face of bumper ceramic layer 20. Second bumper confining layer 25 is defined by a front and back face with the back face of second bumper confining layer 25 placed against the front face of second bumper shock attenuator layer 24.

Preferably, second bumper shock attenuator and confining layers 24 and 25 are constructed of the same materials and in the same manner as first bumper shock attenuator and confining layers 21 and 22. Second bumper shock attenuator layer 24 provides the advantage of attenuating the shock wave resulting from a projectile's impact from reaching bumper ceramic layer 20 and precracking the ceramic material before the projectile reaches bumper ceramic layer 20. Second bumper confining layer 25 is advantageous because it provides more complete confinement of ceramic material that may be fractured from a projectile, thus allowing fractured ceramic material to maintain some effectiveness to withstand further projectile penetration.

Figure 3:
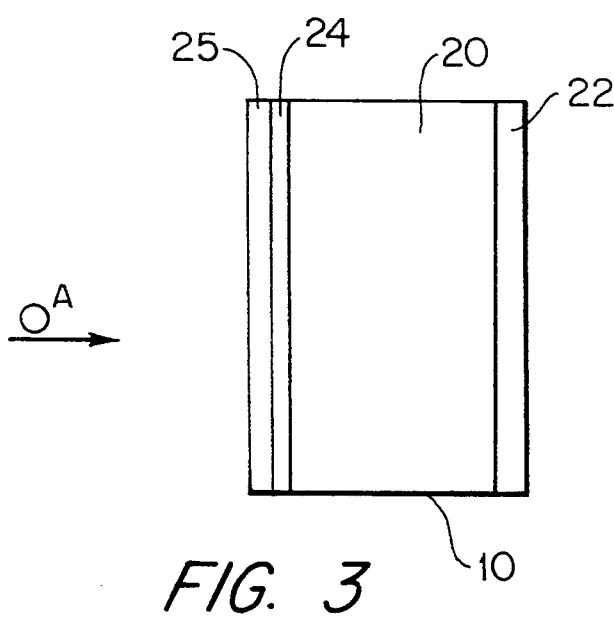
FIG. 3 is a side view of an alternative embodiment of a fully-confined ceramic embodiment of the invention including one shock attenuator layer.

In an alternative embodiment of the invention, first bumper shock attenuator layer 21 is omitted from bumper 10. As embodied herein and shown in FIG. 3, first bumper confining layer 22 is preferably attached directly to the back face of bumper ceramic layer 20 with a high temperature cement and the ratio of the thicknesses of said first bumper confining layer 22 and bumper ceramic layer 20 is no greater than 1 to 2. All other assembly steps are carried out as described above. This embodiment has the advantage of reducing a layer but yet provides some shock attenuation from second bumper shock attenuator layer 24.

In another embodiment of the invention, bumper 10 includes a bumper shock layer 26. Bumper shock layer 26 may be attached to the front face of any of the embodiments of bumper 10 described herein.

Figure 4:
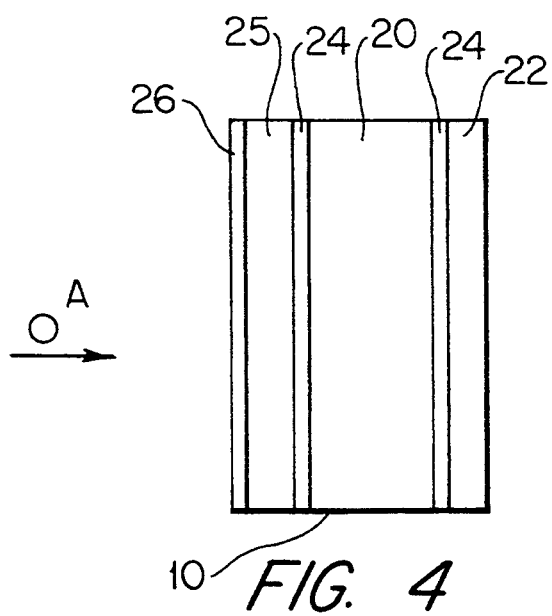
FIG. 4 is a side view of a fully-confined ceramic embodiment of the invention with a thin shock layer.

In a preferred embodiment as described herein and shown in FIG. 4, bumper shock layer 26 is attached to the front face of second bumper confining layer 25. Preferably, bumper shock layer 26 is made of a material with a high hardness and toughness, such as, but not limited to, for example, $Al_2O_3$, $B_4C$, Ti, or Ni. Preferably, bumper shock layer 26 is less than 0.012 in. thick, more preferably between 0.001-0.006 in. thick.

The thin layer of high hardness/toughness material is advantageous because it provides a strong shock to the projectile causing fragmentation of the projectile without much weight penalty to the protective shield. More preferably, bumper shock layer 26 is made of alumina which is advantageous because of its low cost and because it can be anodized onto an aluminum second bumper confining layer 25. Alternatively, bumper shock layer 26 may be attached to second bumper confining layer 25 by chemical vapor deposition or flash coating, both techniques facilitating the use of additional high hardness/toughness materials for bumper shock layer 26, which those skilled in the art can select without undue experimentation.

In yet another embodiment of the invention, the protective shield includes a curtain 50 disposed in spaced alignment with the front face of bumper 10 and a means for supporting and maintaining curtain 50 in spaced alignment with bumper 10. Bumper 10 may have the structure of any of the embodiments described herein, including, for example, an open-faced ceramic or a fully confined ceramic structure. Curtain 50 is defined by a front face and back face.

Curtain 50 preferably is made of a ceramic fiber-based material, more preferably including $Al_2O_3$, $B_2O_3$, and $SiO_2$ fibers, such as found in Nextel ® (available from MacMaster-Cart ® No. 87665K83). Alternatively, curtain 50 can be made of Kevlar ®, but such material may require a coating with a ceramic-based material to be space environment conditioned.

Preferably, curtain 50 is a layer 0.050 in. thick or less minimizing mass to the protective shield and reducing the probability that spalled material from curtain 50 will become a secondary source of damage to the spacecraft. Curtain 50 is advantageous because it offers an additional shock interface to projectiles causing further fragmentation, thermal melting, and/or vaporization of the projectiles. More than one curtain, each possibly at different angles, may be used to give further repeat shocks to projectiles. It is to be appreciated therefore that changes may be made to the placement of curtain 50 by those of ordinary skill in the pertinent art without departing from the spirit of this invention.

Figure 5:
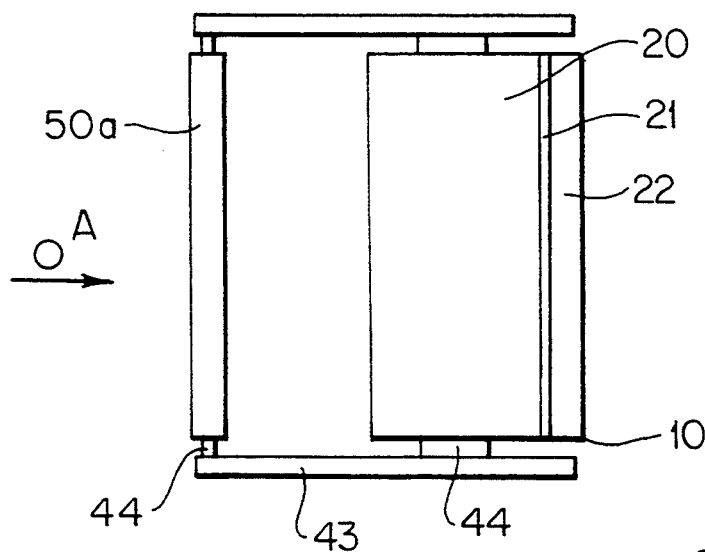
FIG. 5 is a top view of an embodiment of the invention with an open-faced ceramic bumper and a curtain.

For one embodiment, as shown in FIG. 5, curtain 50a is placed with its back face substantially parallel to the front face of bumper 10. This placement minimizes the weight penalty to the protective shield because it utilizes the shortest length of curtain as compared with a curtain placed at an angle to the plane of the front face of bumper 10. Alternatively, curtain 50 may be placed at an angle to the plane of the front face of bumper 10. This placement requires a projectile penetrating in a direction perpendicular to the front face of bumper 10 to travel through more curtain material subjecting the projectile to further frictional and drag forces. This placement further redirects the path of the projectile debris cloud resulting as the debris exits curtain 50 so that it impacts additional components of the protective shield or the spacecraft pressure hull at an angle and spread over a larger surface area.

Preferably, as embodied herein and shown in FIG. 5, the means for supporting and maintaining curtain 50a in spaced alignment with bumper 10 includes a member 43 and connectors 44. Member 43 extends out from bumper 10 to curtain 50a. Connectors 44 are attached between member 43 and bumper 10 and curtain 50a. Connectors 44 can be any connecting device that will maintain integrity in the space environment and will withstand stresses caused by thermal expansion of bumper 10 and member 43. Preferably, connectors 44 are zirconia cement or any other adhesive acceptable for a space environment.

Figure 6:
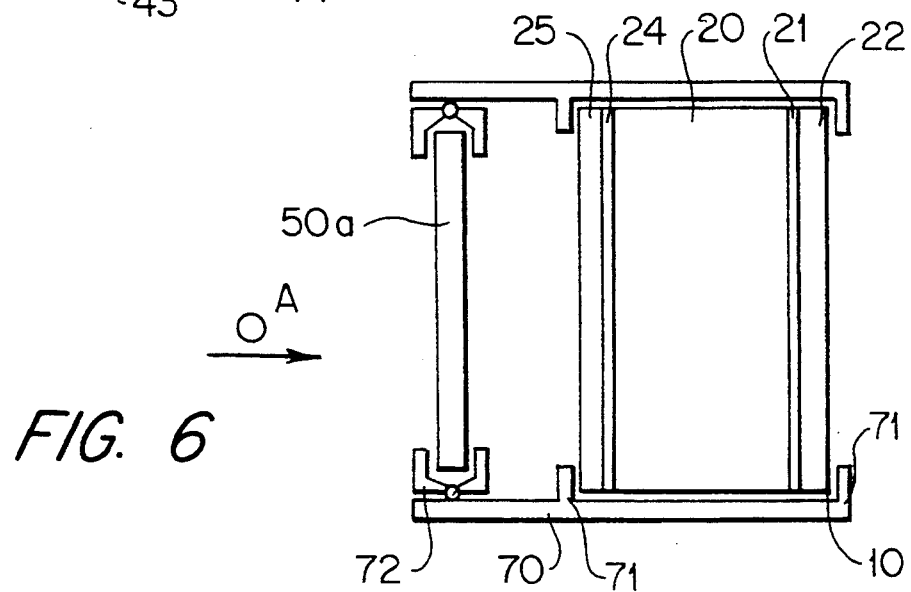
FIG. 6 is a top view of an embodiment of the invention with a fully-confined ceramic bumper and a curtain.

Alternatively, as embodied herein and shown in FIG. 6, the supporting means includes a member 70 extending out from bumper 10 to curtain 50a, brackets 71, and clamps 72. Brackets 71 extend outward perpendicular to member 70 to confine bumper 10 and prevent its movement toward curtain 50a. Clamps 72 are attached to member 70 and grip curtain 50a. Clamps 72 are advantageous because they provide a firmer grip on curtain 50a which is thin compared to bumper 10.

In yet another embodiment of the invention, the protective shield includes bumper 10 and a base armor member 30, defined by a front and back face with the front face of base armor member 30 disposed in spaced alignment with the back face of bumper 10. In addition, this embodiment includes a means for supporting and maintaining base armor member 30 in spaced alignment with bumper 10.

Bumper 10 may be any of the embodiments described herein, but preferably is the fully-confined ceramic embodiment with bumper shock layer 26. Base armor member 30 may be the pressure hull of the spacecraft; an additional layer of a ductile material, preferably with a modulus of elasticity greater than $9 \times 10^6$ psi, a yield strength greater than $20 \times 10^3$ psi, a percent elongation greater than 8%, and a density less than 10 g/cm$^3$ such as, for example, aluminum; or a structure similar to any of the embodiments of bumper 10 described herein.

Figure 7:
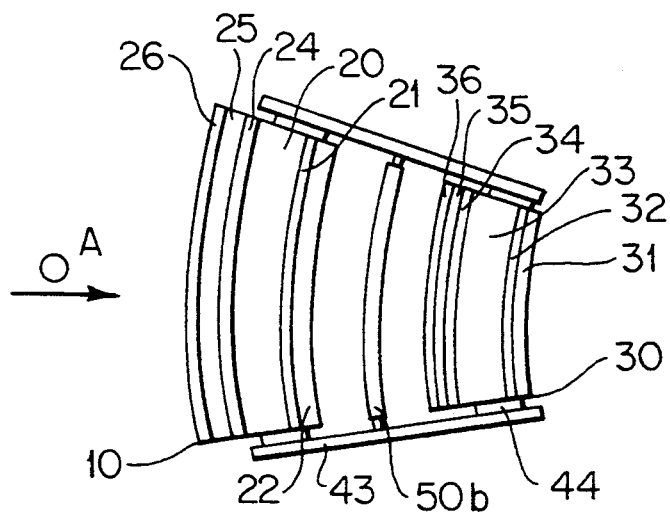
FIG. 7 is a top view of a modular section of an embodiment of the invention with a fully-confined ceramic bumper and a fully-confined ceramic base armor member both with thin shock layers and a curtain.

Preferably, as embodied herein and shown in FIG. 7, the supporting means include a member 43 and connectors 44, the same as the preferred means for supporting and maintaining bumper 10 in spaced alignment with curtain 50a described above. Connectors 44 can be any connecting device that will maintain integrity in the space environment and withstand stresses caused by thermal expansion of bumper 10, base armor member 30, and member 43. Preferably, connectors 44 are zirconia cement or any other adhesive acceptable for a space environment.

Figure 8:
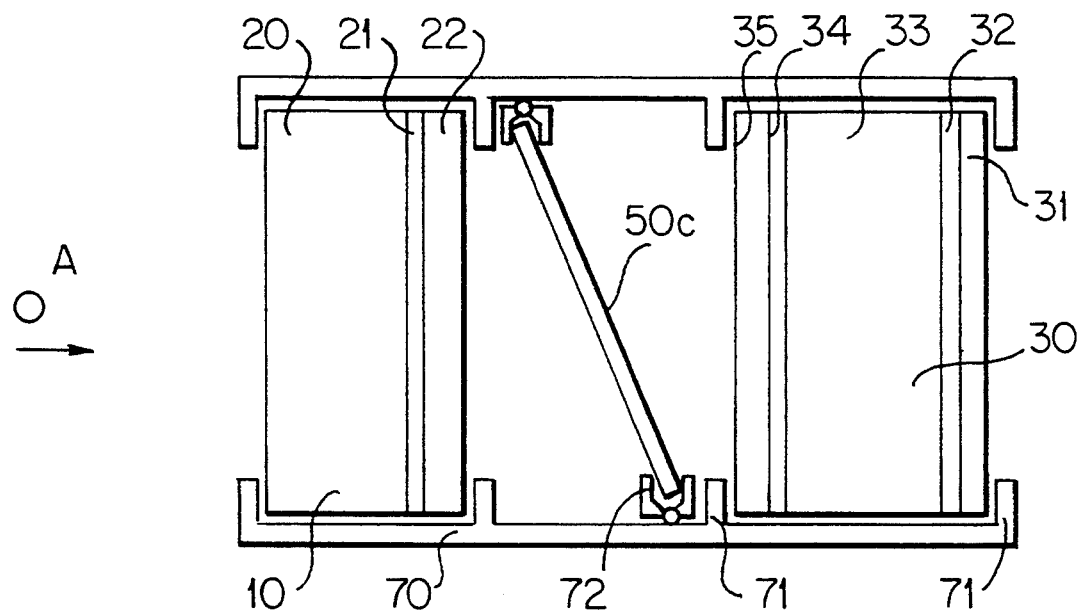
FIG. 8 is a top view of an embodiment of the invention with an open-faced ceramic bumper, a fully-confined base armor member, and a curtain.

Alternatively, as embodied herein and shown in FIG. 8, the supporting means includes a member 70 extending out from base armor member 30 to bumper 10 and brackets 71. Brackets 71 extend outward perpendicular to member 70 to confine bumper 10 and base armor member 30 from movement toward each other.

Preferably, as shown in FIG. 7, base armor member 30 includes a first and second base armor confining layers 31 and 35, first and second base armor shock attenuator layers 32 and 34, a base armor ceramic layer 33, and a base armor shock layer 36.

First base armor confining layer 31 is defined by a front and back face. First base armor confining layer 31 provides the same advantages outlined for first bumper confining layer 22 and its preferred construction is the same as that noted above for first bumper confining layer 22 and shown in FIG. 4.

First base armor shock attenuator layer 32 is defined by a front and back face, with the back face of first base armor shock attenuator layer 32 placed against the front face of first base armor confining layer 31. First base armor shock attenuator layer 32 provides the advantages and is preferably constructed the same as first bumper shock attenuator layer 21 described above and shown in FIG. 4.

Base armor ceramic layer 33 is defined by a front and back face, with the back face of base armor ceramic layer 33 placed against the front face of first base armor shock attenuator layer 32. The advantages and preferred structural features of base armor ceramic layer 33 are the same as those for bumper ceramic layer 20 described above and shown in FIG. 4.

Second base armor shock attenuator layer 34 is defined by a front and back face, with the back face of second base armor shock attenuator layer 34 placed against the front face of base armor ceramic layer 33. The advantages and preferred structural features of second base armor shock attenuator layer 34 are the same as those for second bumper shock attenuator layer 24 described above and shown in FIG. 4.

Second base armor con,fining layer 35 is defined by a front and back face, with the back face of second base armor confining layer 35 placed against the front face of second base armor shock attenuator layer 34. The advantages and preferred structural features of second base armor confining layer 35 are the same as those for second bumper confining layer 25 described above and shown in FIG. 4.

Base armor shock layer 36 is attached to the front face of base armor second confining layer 35. The advantages and preferred structural features of base armor shock layer 36 are the same as those described for bumper shock layer 26 described above and shown in FIG. 4.

In yet another embodiment of the invention, the protective shield includes bumper 10, base armor member 30, and curtain 50. Bumper 10 and base armor member 30 can be in any of the embodiments described herein, but preferably includes the fully-confined ceramic embodiments of bumper 10 and base armor member 30 with thin shock layers 26 and 36. Curtain 50 is preferably made of the same materials and has the advantages described above.

In a preferred embodiment as shown in FIG. 7, curtain 50b is preferably positioned between bumper 10 and base armor member 30 with its back face substantially parallel to the front face of base armor plate 30 and the back face of bumper 10. This placement minimizes the weight penalty because it utilizes the shortest length of the curtain as compared with a curtain placed at an angle to the plane of the front face of base armor member 30.

Alternatively, as shown in FIG. 8 for another embodiment of the curtain, curtain 50c is placed at an angle to the plane of the front face of base armor member 30. This placement requires a projectile penetrating in a direction perpendicular to the back face of bumper 10 to travel through more curtain material subjecting the projectile to further frictional and drag forces. This embodiment further redirects the path of the projectile debris cloud resulting as the debris exits curtain 50c so that it impacts base armor member 30 at an angle and spread over a larger surface area.

Preferably, the means for supporting and maintaining curtain 50b or 50c between bumper 10 and base armor member 30 is the same as the means utilized for supporting and maintaining base armor member 30 in spaced alignment with bumper 10, described above and as shown in FIG. 7. Alternatively, as shown in FIG. 8, clamps 72 attached to member 70 may be used to hold curtain 50b or 50c between bumper 10 and base armor member 30.

In yet another embodiment of the present invention, the protective shield includes loops for attaching the protective shield to a spacecraft or to another modular section of the protective shield.

Figure 9:
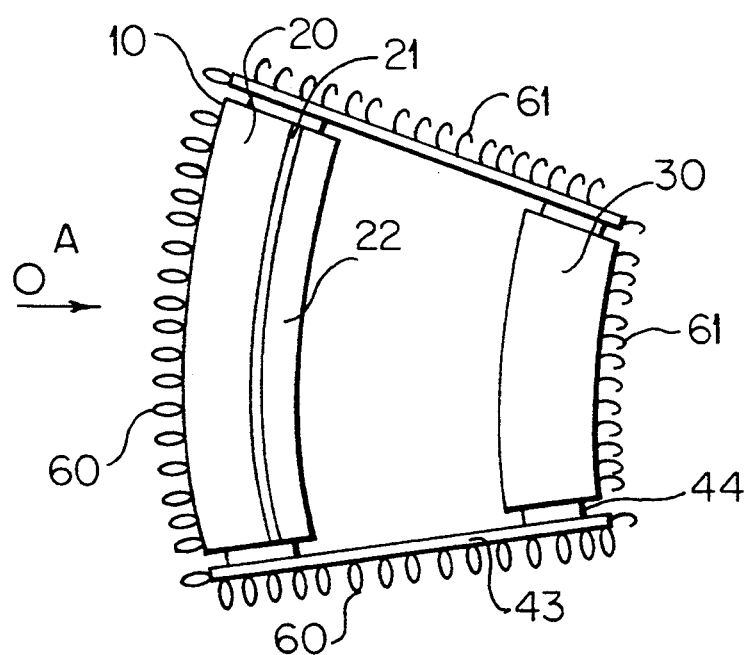
FIG. 9 is a top view of a modular section of an embodiment of the invention with an open-faced ceramic bumper and a base armor member showing hooks and loops for various points of attachment.

As embodied herein and shown in FIG. 9, loops 60 are attached to the front face of bumper 10. Preferably, loops 60 are made of brass or any other space-qualified material. Loops 60 are advantageous because they provide a means for attaching an additional protective shield in the event that enhanced protection is recognized as necessary in the future or in the event that an old shield has been damaged. The protective shield that is to be added is equipped with hooks that intertwine and connect with loops 60. Loops 60 preferably are brazed onto the front face of bumper 10 or member 43.

In yet another embodiment of the invention, the protective shield would further include hooks for attaching the protective shield to a spacecraft or to another modular section of the protective shield.

As embodied herein and shown in FIG. 9, hooks 61 are placed on the back face of base armor member 30 or member 43. Preferably, hooks 61 are made of brass or any other space-qualified material. Hooks 61 are advantageous because they provide a means for assembling a protective shield on a spacecraft in space if the spacecraft includes loops 60, as described above, on its pressure hull or protective shield. Hooks 61 are preferably brazed onto the back face of base armor member 30. Additionally, hooks 61 can be attached to the furthest back face of any of the embodiments described herein.

in yet another embodiment, as shown in FIG. 9, loops 60 or hooks 61 can be placed on member 43 to allow assembly to another adjacent modular section of protective shield.

Examples

The invention will be further clarified by the following examples, which are intended to be purely exemplary of the invention. Test shields were constructed with areal densities as shown in Table 1. As noted earlier, for purposes of explaining the present invention the use of the terms "bumper" and "base armor" are not limited herein to their traditional usage such that a "bumper" is a shielding component in addition to a "base armor." Accordingly, several of the test shields are listed as containing only bumpers, but exemplify what could be used as "base armor" under the traditional usage of that term.

TABLE 1

| Test Shield Shot # | Areal Density (g/cm²) | |
|---|---|---|
| | Bumper | Base Armor |
| 1 | 0.408 | 0.608 |
| 2 | 0.384 | 0.608 |
| 3 | 0.397 | 0.608 |
| 4 | 0.584 | — |
| 4A | 0.584 | — |
| 5 | 0.606 | — |
| 6 | 0.608 | — |
| 7 | 0.586 | — |

The test shields were constructed with six inch diameter circular targets held in place by a holder having dimensions approximately 8 in.×8 in. A 0.250 in. thick aluminum witness plate was placed behind the test shield to catch any projectile fragments or spall that completely penetrated the shield. All layers were connected by bolts running through the four corners of each layer. A two-stage light-gas gun was used to propel projectiles with sabot halves. For most of the tests, the projectiles would encounter a sabot stripper before reaching the test shield to prevent the sabot halves from reaching the test shield. The projectile velocity was measured using a pair of ECG 3036 photo transistors.

Example 1

A baseline test shield was constructed with a 0.060 in. thick 1100 aluminum bumper 10, a 0.090 in. thick 1100 aluminum base armor member 30 and a 0.025 in. thick Nextel ® curtain 50 between bumper 10 and base armor member 30. Bumper 10 and base armor 30 were both separated from curtain 50 by a 1.0 in. spacing.

A 0.848 mm spherical 1100 aluminum projectile was propelled at the test shield with an impact velocity of 7.15 km/s. The projectile penetrated bumper 10 creating a 3.76 mm diameter hole. The projectile also made a 2.54 mm diameter hole in curtain 50 and left pits on the front face of base armor member 30.

Example 2

A test shield in accordance with the present invention was constructed with bumper 10 including a 0.035 in. thick SiC bumper ceramic layer 20, a 0.050 in. thick zirconia felt first bumper shock attenuator layer 21, and a 0.010 in. thick 1100 aluminum bumper confining layer 22. The test shield additionally included base armor member 30 and curtain 50 the same as in Example 1.

A 0.859 mm spherical 1100 aluminum projectile was propelled at the test shield, hit the sabot stripper, broke up into fragments, and hit the shield with an impact velocity of 7.48 km/s. The fragmented projectile caused three dents on the back face of bumper 10, but no penetration or spallation to curtain 50. The silicon carbide bumper ceramic layer 20 was not shattered, but a small shallow crater was made in the front of ceramic layer 20. Another 0.864 mm spherical 1100 aluminum projectile was propelled at the test shield with an impact velocity of 7.32 km/s. The projectile penetrated bumper 10 making a 3.56 mm diameter hole. Projectile fragments and bumper spall pierced curtain 50 and left dust and discoloration on base armor member 30. There was no penetration into base armor member 30.

Example 3

A test shield was constructed in accordance with the present invention with bumper 10 including a 0.020 in. thick SiC bumper ceramic layer 20, two 0.050 in. thick zirconia felt first and second bumper shock attenuator layers 21 and 24, and two 0.010 in. thick 1100 aluminum first and second bumper confining layers 22 and 25. The test shield additionally included an 1100 aluminum base armor member 30 and curtain 50 the same as in Example 1.

A 0.813 mm spherical 1100 aluminum projectile was propelled at the test shield with an impact velocity of 7.42 km/s. The projectile did not penetrate bumper 10, but some bulging of the back face of bumper 10 was noted. Upon disassembly of the test shield, it was determined that the projectile had made a 3.05 mm diameter hole through the front face of second bumper confining layer 25 and had also penetrated bumper ceramic layer 20, but had not shattered it. No large pieces of projectile or ceramic were noted in the impact area.

Example 4

A test shield was constructed in accordance with the present invention with a bumper 10 including a 0.060 in. thick SiC bumper ceramic layer 20, a 0.050 in. thick zirconia felt first bumper attenuator layer 21, and a 0.010 in. thick 1100 aluminum first bumper confining layer 22. The test shield additionally included a 0.025 in. Nextel ® curtain 50 separated from the front face of bumper 10 by 1.0 in.

A 0.762 mm spherical 1100 aluminum projectile was propelled at the test shield with an impact velocity of 7.23 km/s. The projectile made a neat round hole in curtain 50 and was fragmented. The fragments made a large crater in bumper 10, but did not completely penetrate bumper 10.

Example 4A

The test shield from Example 4 was used again, but without curtain 50.

A 0.838 mm projectile was propelled at the test shield with an impact velocity of 7.64 km/s. The projectile penetrated bumper 10 making a 2.79 mm diameter hole. Ceramic layer 20 was not broken into pieces and only small cracks were noted near the hole.

Example 5

A test shield was constructed in accordance with the present invention with bumper 10 including a 0.050 in. thick SiC bumper ceramic layer 20, two 0.050 in. thick zirconia felt first and second bumper shock attenuator layers 21 and 24, and two 0.010 in. thick 1100 aluminum first and second bumper confining layers 22 and 25.

A 0.838 mm spherical 1100 aluminum projectile was propelled at the test shield with an impact velocity of 7.67 km/s. The sabot from the test gun was not stripped from the projectile in order to test the shield's ability to withstand multiple hits in close proximity. The sabot halves separated slightly from the projectile during flight and impacted on both sides of the projectile approximately 10 mm away. The impacts bowed out the front of second confining layer 25 and made three holes in that layer and two dents to the back face of first bumper confining layer 22. The holes in the second confining layer were 4.32 mm in diameter for the sabot halves and 4.06 mm for the projectile. Upon disassembly of the test shield, it was determined that there were no large fragments of the projectile or sabot in first bumper confining layer 22. The ceramic outside of the impact area was not damaged.

Example 6

A baseline test shield was constructed with a 0.090 in. thick 1100 aluminum bumper 10.

A 0.843 mm spherical 1100 aluminum projectile was propelled at the test shield with an impact velocity of 7.54 km/s. The sabot was not stripped away from the projectile. Both the sabot halves and projectile completely penetrated bumper 10 and left craters and aluminum on the witness plate. The sabot halves made 4.83 mm and 5.80 mm diameter holes and the projectile made a 3.56 mm diameter hole.

Example 7

A test shield was constructed in accordance with the present invention with a bumper 10 including a 0.038 in. thick B$_4$C bumper ceramic layer 20, two 0.050 in. thick first and second shock attenuator layers 21 and 24, two 0.010 in. thick 1100 aluminum first and second confining layers 22 and 25, and a 0.003 in. thick alumina bumper shock layer 26.

A 0.848 mm spherical 1100 aluminum projectile was propelled at the test shield with an impact velocity of 7.67 km/s. Bumper 10 completely stopped the projectile.

Other embodiments of the invention will be apparent to those skilled in the art from the consideration of the specification and practice of the invention disclosed herein. It is intended that the specification and examples be considered as exemplary only, with a true scope and spirit of the invention being indicated by the following claims.

What is claimed is:

1. A protective shield apparatus for protecting spacecraft from impact with hypervelocity objects comprising a bumper defined by a front and back face and further comprising:
   a bumper ceramic layer, defined by a front and back face;
   a first bumper shock attenuator layer, defined by a front and back face, with the front face of the shock attenuator layer placed substantially against the back face of the ceramic layer;
   a first bumper confining layer, defined by a front and back face, with the front face of the confining layer placed substantially against the back face of the shock attenuator layer;
   a second bumper shock attenuator layer, defined by a front and back face, with the back face of the second bumper shock attenuator layer placed substantially against the front face of said bumper ceramic layer; and
   a second bumper confining layer, defined by a front and back face, with the back face of the second bumper confining layer placed substantially against the front face of the second bumper shock attenuator layer.

2. A protective shield as defined in claim 1, wherein said bumper ceramic layer has a Vickers hardness of greater than 1000 kg/mm$^2$, a density less than 5.0 g/cm$^3$, and a melting point greater than 1700° C.

3. A protective shield as defined in claim 2, wherein said first and second bumper confining layers comprise a material with a modulus of elasticity greater than $9 \times 10^6$ psi, a yield strength greater than $20 \times 10^3$ psi, a percent elongation greater than 8%, and a density less than 10 g/cm$^3$.

4. A protective shield as defined in claim 3, wherein said first and second bumper shock attenuator layers comprise zirconia felt.

5. A protective shield as defined in claim 4, wherein the ratio of the thicknesses of said first bumper confining layer and said bumper ceramic layer is no greater than 1 to 2.

6. A protective shield as defined in claim 2, wherein said bumper further comprises a thin shock layer attached to the front face of said second bumper confining layer.

7. A protective shield as defined in claim 6, wherein said bumper shock layer is 0.001–0.006 in. thick.

8. A protective shield as defined in claim 7, wherein said bumper shock layer comprises Al$_2$O$_3$.

9. A protective shield as defined in claim 1 further comprising:
   a base armor member defined by a front and back face, with the front face of the base armor member disposed in spaced alignment with the back face of said bumper; and
   a means for supporting and maintaining the base armor member in spaced alignment with said bumper.

10. A protective shield as defined in claim 9, wherein said base armor member comprises:
    a first base armor confining layer, defined by a front and back face;
    a first base armor shock attenuator layer, defined by a front and back face, with the back face of the first base armor shock attenuator layer placed substantially against the front face of the first base armor confining layer;
    a base armor ceramic layer, defined by a front and back face, with the back face of the first bas armor ceramic layer placed substantially against the front face of the first base armor shock attenuator layer;
    a second base armor shock attenuator layer, defined by a front and back face, with the back face of the second base armor shock attenuator layer placed substantially against the front face of the base armor ceramic layer; and
    a second base armor confining layer, defined by a front and back face, with the back face of the second base armor confining layer placed substantially against the front face of the second base armor shock attenuator layer.

11. A protective shield as defined in claim 10 further comprising a curtain positioned between the front face of said base armor member and the back face of said bumper.

12. A protective shield as defined in claim 11, wherein said curtain comprises Al$_2$O$_3$, B$_2$O$_3$, and SiO$_2$ fibers.

13. A protective shield apparatus for protecting spacecraft from impact with hypervelocity objects comprising a bumper defined by a front and back face and further comprising:
   a bumper ceramic layer, defined by a front and back face;
   a first bumper shock attenuator layer, defined by a front and back face, with the front face of the shock attenuator layer placed substantially against the back face of the ceramic layer; and a first bumper confining layer, defined by a front and back face, with the front face of the confining layer placed substantially against the back face of the shock attenuator layer wherein the ratio of the thickness of said first bumper confining layer and said bumper ceramic layer is no greater than 1 to 2, and wherein said bumper ceramic layer has a Vickers hardness of greater than 1000 kg/mm$^2$, a density less than 5.0 g/cm$^3$, and a melting point greater than 1700° C.

14. A protective shield as defined in claim 13, further comprising:

a base armor member, defined by a front and back face, with the front face of the base armor member disposed in spaced alignment with the back face of said bumper; and a means for supporting and maintaining the base armor member in spaced alignment with said bumper wherein said base armor member comprises:

a first base armor confining layer, defined by a front and back face;

a first base armor shock attenuator layer, defined by a front and back face, with the back face of the first base armor shock attenuator layer placed substantially against the front face of the first base armor confining layer;

a base armor ceramic layer, defined by a front and back face, with the back face of the first armor ceramic layer placed substantially against the front face of the first base armor shock attenuator layer;

a second base armor shock attenuator layer, defined by a front and back face, with the back face of the second base armor shock attenuator layer placed substantially against the front face of the base ceramic layer; and a second base armor confining layer, defined by a front and back face, with the back face of the second base armor confining layer placed substantially against the front face of the second base armor shock attenuator layer.

15. A protective shield as defined in claim 14, wherein said base armor member further comprises a thin base armor shock layer attached to the front face of the second base armor confining layer.

16. A protective shield as defined in claim 13 further comprising attachment loops brazed on said bumper.

17. A protective shield as defined in claim 13 further comprising:

a base armor member, defined by a front and back face, with the front face of the base armor member disposed in spaced alignment with the back face of said bumper;

a means for supporting and maintaining the base armor member in spaced alignment with said bumper; and attachment loops brazed on said bumper.

18. A protective shield as defined in claim 13 further comprising:

a base armor member, defined by a front and back face, with the front face of the base armor member disposed in spaced alignment with the back face of said bumper;

a means for supporting and maintaining the base armor member in spaced alignment with said bumper; and attachment hooks brazed on said base armor member.

19. A protective shield as defined in claim 13 further comprising a curtain.

20. A protective shield apparatus for protecting spacecraft from impact with hypervelocity objects comprising a bumper defined by a front and back face and further comprising:

a bumper ceramic layer, defined by a front and back face;

a first bumper confining layer, defined by a front and back face, with the front face of the first bumper confining layer placed substantially against the back face of the bumper ceramic layer, wherein the ratio of the thicknesses of the first bumper confining layer and the bumper ceramic layer is no greater than 1 to 2;

a second bumper shock attenuator layer, defined by a front and back face, with the back face of the second bumper shock attenuator layer placed substantially against the front face of the bumper ceramic layer; and a second bumper confining layer, defined by a front and back face, with the back face of the second bumper confining layer placed substantially against the front face of the second bumper shock attenuator layer.

* * * * *